US009842169B1

(12) United States Patent
Shim et al.

(10) Patent No.: US 9,842,169 B1
(45) Date of Patent: Dec. 12, 2017

(54) ACTIONABLE SOCIAL NEWS GENERATOR

(75) Inventors: Hohyun Shim, San Francisco, CA (US); Abhishek Kumar, Santa Clara, CA (US)

(73) Assignee: Zynga Inc., San Francisco, CA (US)

( * ) Notice: Subject to any disclaimer, the term of this patent is extended or adjusted under 35 U.S.C. 154(b) by 720 days.

(21) Appl. No.: 13/566,602

(22) Filed: Aug. 3, 2012

(51) Int. Cl.
*G06F 17/30* (2006.01)
(52) U.S. Cl.
CPC ............... *G06F 17/30867* (2013.01)
(58) Field of Classification Search
CPC ............ G06F 17/30867; G06F 17/30864
USPC ....... 707/737, 767, 730, 732, 769, 748, 719; 463/42, 9; 705/64, 65; 715/760
See application file for complete search history.

(56) References Cited

U.S. PATENT DOCUMENTS

| | | | |
|---|---|---|---|
| 2003/0040363 A1* | 2/2003 | Sandberg | 463/42 |
| 2004/0068481 A1* | 4/2004 | Seshadri et al. | 707/1 |
| 2006/0135259 A1* | 6/2006 | Nancke-Krogh | A63F 13/12 463/42 |
| 2007/0180522 A1* | 8/2007 | Bagnall | 726/22 |
| 2008/0167130 A1* | 7/2008 | Kroeckel | G07F 17/3248 463/42 |
| 2008/0243853 A1* | 10/2008 | Reding | H04L 51/32 |
| 2008/0262969 A1* | 10/2008 | Samid | 705/64 |
| 2009/0054123 A1* | 2/2009 | Mityagin | A63F 13/12 463/9 |
| 2011/0190066 A1* | 8/2011 | Barclay | G07F 17/3227 463/42 |
| 2012/0004038 A1* | 1/2012 | Van Luchene | G07F 17/3274 463/42 |
| 2012/0005209 A1* | 1/2012 | Rinearson et al. | 707/737 |
| 2012/0030193 A1* | 2/2012 | Richberg | G06Q 10/10 707/719 |
| 2012/0124073 A1* | 5/2012 | Gross et al. | 707/767 |
| 2012/0142428 A1* | 6/2012 | Wilson et al. | 463/42 |
| 2012/0214564 A1* | 8/2012 | Barclay et al. | 463/11 |
| 2012/0264520 A1* | 10/2012 | Marsland | H04L 67/38 463/42 |
| 2013/0066864 A1* | 3/2013 | Rose | G06F 3/048 707/732 |
| 2013/0296060 A1* | 11/2013 | Hayden | G07F 17/3225 463/42 |
| 2013/0344964 A1* | 12/2013 | Sloan et al. | 463/42 |
| 2014/0046973 A1* | 2/2014 | Rinearson | G06F 17/30011 707/769 |

OTHER PUBLICATIONS

Facebook's New Games, Apps Dashboards Curtail Notification Spam, Eric Cao,Jan. 22, 2010 http://www.gamasutra.com/view/news/117863/Facebooks_New_Games_Apps_Dashboards_Curtail_Notification_Spam.php.*

* cited by examiner

*Primary Examiner* — Jeffrey A Burke
*Assistant Examiner* — Thong Vu
(74) *Attorney, Agent, or Firm* — Schwegman Lundberg & Woessner, P.A.

(57) ABSTRACT

A method of encouraging a user to be active with respect to a game networking system on a particular day is disclosed. An event is detected on the game networking system. A newsworthiness of the event to the user is determined. An action that the user is likely to want to perform on the game networking system in response to receiving information pertaining to the event is determined. A notification is generated that includes the information pertaining to the event and information pertaining to the action. The notification is sent to the user.

17 Claims, 10 Drawing Sheets

ACTIONABLE SOCIAL NEWS GENERATOR

TECHNICAL FIELD

The present application relates generally to the technical field of internet marketing and, in one specific example, to providing social news to a user of a game networking system in order to increase a probability that the user of the game networking system will be active with respect to the game networking system on a particular day.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events, and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, and the like. A player character in an online poker game may be able to play at specific tables, place bets of virtual currency for certain amounts, play or fold certain hands, play in a online poker tournament, and so forth.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In various embodiments, methods and systems of encouraging users to be active with respect to a game networking system on a particular day are disclosed. An event is detected on the game networking system. A newsworthiness of the event to a user is determined. An action that the user is likely to want to perform on the game networking system in response to receiving information pertaining to the event is determined. A notification is generated that includes the information pertaining to the event and information pertaining to the action. The notification is sent to the user.

Figure 1:
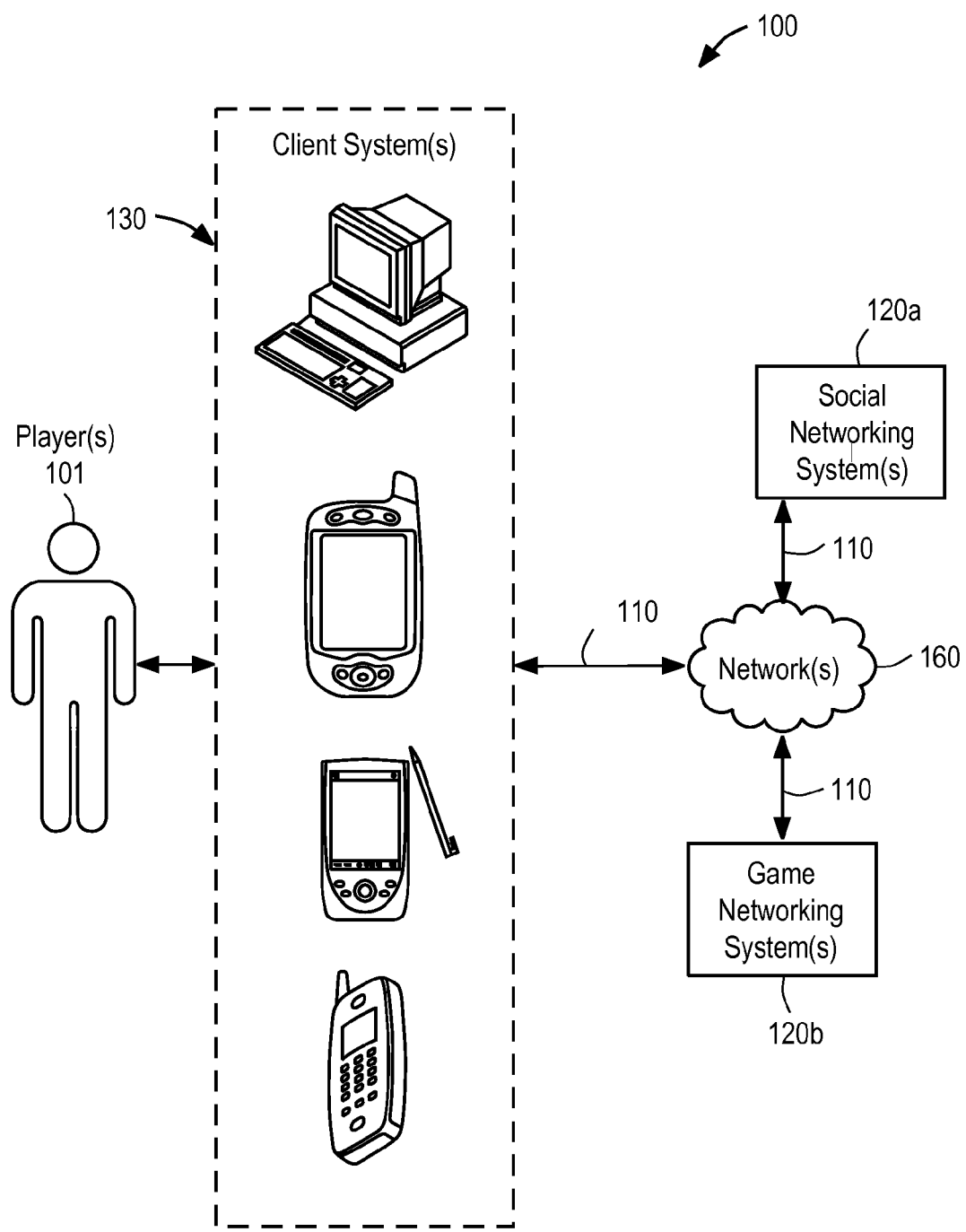
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises player 101, social networking system 120a, game networking system 120b, client system 130, and network(s) 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and the like.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, thereby bypassing network 160.

Online Games and Game Systems
Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including NPCs and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state, etc.). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation.

This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120*a* or game networking system 120*b*). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120*b*, which is managed by the game operator. In other embodiments, the social graph is part of a social networking system 120*a* managed by a third-party (e.g., Facebook, Friendster, Myspace). In yet other embodiments, player 101 has a social network on both game networking system 120*b* and social networking system 120*a*, wherein player 101 can have a social network on the game networking system 120*b* that is a subset, superset, or independent of the player's social network on social networking system 120*a*. In such combined systems, game network system 120*b* can maintain social graph information with edge type attributes that indicate whether a given friend is an "in-game friend," an "out-of-game friend," or both. The various embodiments disclosed herein are operable when the social graph is managed by social networking system 120*a*, game networking system 120*b*, or both.

Figure 2:
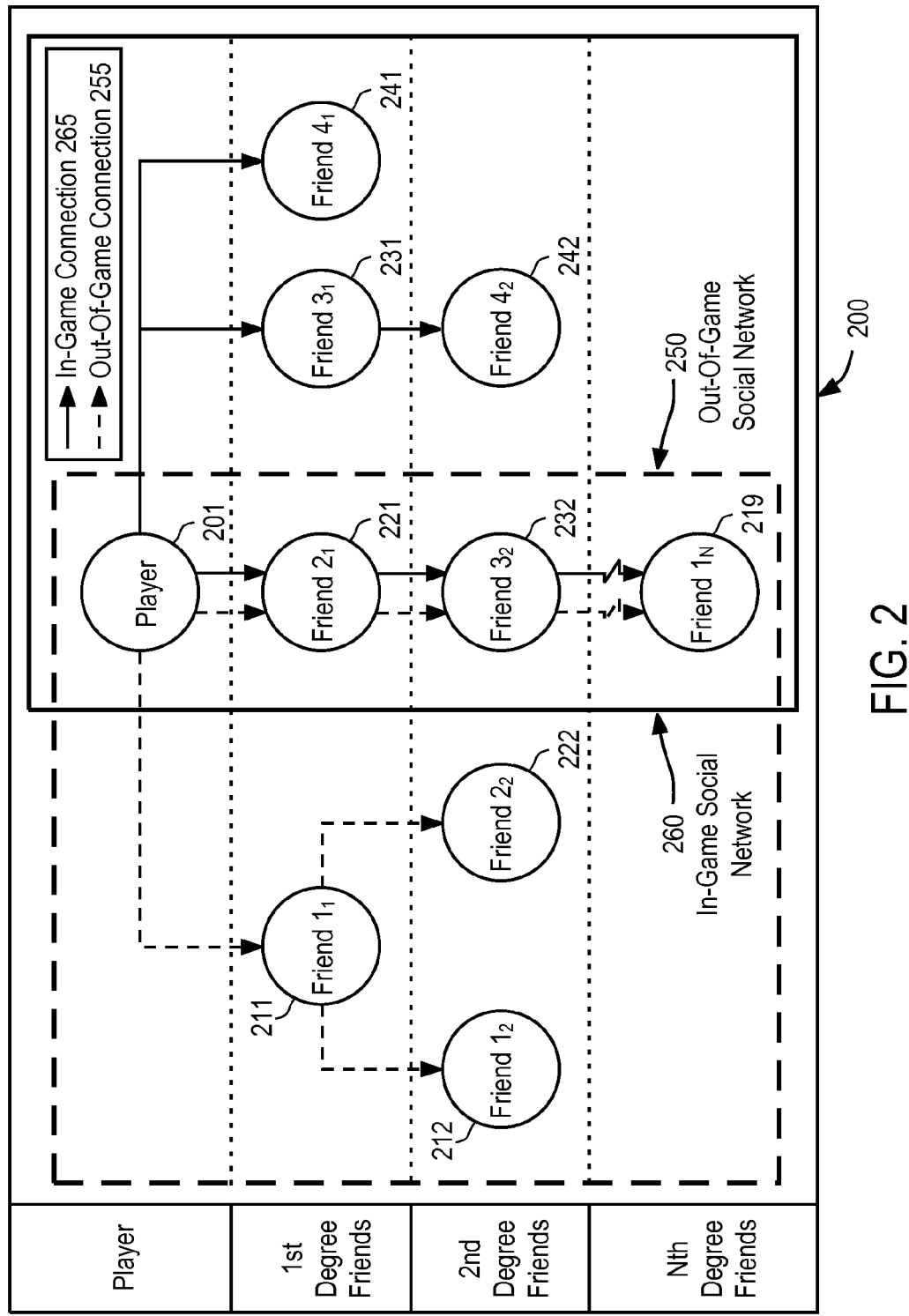
FIG. 2 is a block diagram illustrating an example of a social network within a social graph.

FIG. 2 is a block diagram illustrating an example of a social network 200 within a social graph. As shown, Player 201 can be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to whom he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120*a*.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260, and friend $4_2$ 242 is a second-degree friend with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access an in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Systems

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by a game networking system 2820b, such as the game networking system described below with respect to FIG. 8, which can be accessed over any suitable network with an appropriate client system 2830. A player may have a game system account on game networking system 2820b, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on game networking system 2820b and merely accessed via the third-party website. The embedded online game can be hosted solely on a server of game networking system 2820b or using a third-party vendor server. In addition, any combination of the functions of the present disclosure can be hosted on or provided from any number of distributed network resources. For example, one or more executable code objects that implement all or a portion of the game can be downloaded to a client system for execution.

Virtual Currency

In various embodiments, players within the game can acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some embodiments, virtual currency can be used to purchase one or more in-game assets or other benefits. For example, a player may be able to exchange virtual currency for a desired level, access, right, or item in an online game. In one embodiment, legal currency can be used to directly purchase an in-game asset or other benefit. The player can select the desired in-game asset or other benefit. Once appropriate selections are made, the player can place the order to purchase the in-game asset or other benefit. This order is received by the game networking system 2820b, which can then process the order. If the order is processed successfully, an appropriate financial account associated with the player can be debited by the amount of virtual currency or legal currency needed to buy the selected in-game asset or other benefit.

In some embodiments, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

Generating Actionable Social News

One of the goals of the game networking system 120b (or the operator of the game networking system 120b) may be to increase a number of daily active users (DAU) of the game networking system 120b. The number of daily active users on the game networking system 120b may be the number of users that perform at least one action with respect to the game networking system 120b during a day (e.g., a number of players that access the game networking system to, for example, view a message, play a game, and so on, during the day). One technique that may be used to encourage users of the game networking system to be active on a given day may be to provide news to the users pertaining to the game networking system 120b. For example, the game networking system 120b may provide news to the user of actions that their friends have recently performed with respect to the game networking system 120b. For example, the game networking system 120b may notify a user that a friend of the user has performed an action within a game that the user likes to play on the game networking system 120b. By simply being informed on a particular day that his friend has recently performed an action within the game, the user may be more likely to access the game networking system on that day (e.g., to play the game), thus becoming one of the daily active users of the game networking system on that day.

However, if a user receives too many notifications from the game networking system 120b, or if the user does not consider the notifications to be particularly newsworthy, the user may not be significantly more likely to perform any actions in response to receiving the notifications than if the notifications had not been sent in the first place. In other words, the user may start considering such notifications to be spam. Furthermore, if the user is not provided with suggested actions that the user may perform in response to receiving such notifications, the user may be less likely to perform any such actions. Thus, various factors may affect whether a user becomes active with respect to the game networking system 120b on a particular day in response to receiving notification from the game networking system 120b. Such factors may include how often the user receives notifications from the game networking system, the time of day (e.g., a particular hour) during which the user receives notifications from the game networking system 120b, how newsworthy the user considers the content (e.g., the "news") of the notification to be (e.g., whether the content refers to actions taken by friends of the user with whom the user is particularly close, whether the actions pertain to a particular game on the game networking system 120b that the user is particularly fond of, and so on), the ease with which the user may take meaningful actions with respect to the game networking system 120b in response to the news contained in the notification, and so on. Thus, both the quality and the quantity of the notifications sent to a user may be important factors in encouraging users to be active with respect to the game networking system 120b.

Figure 3:
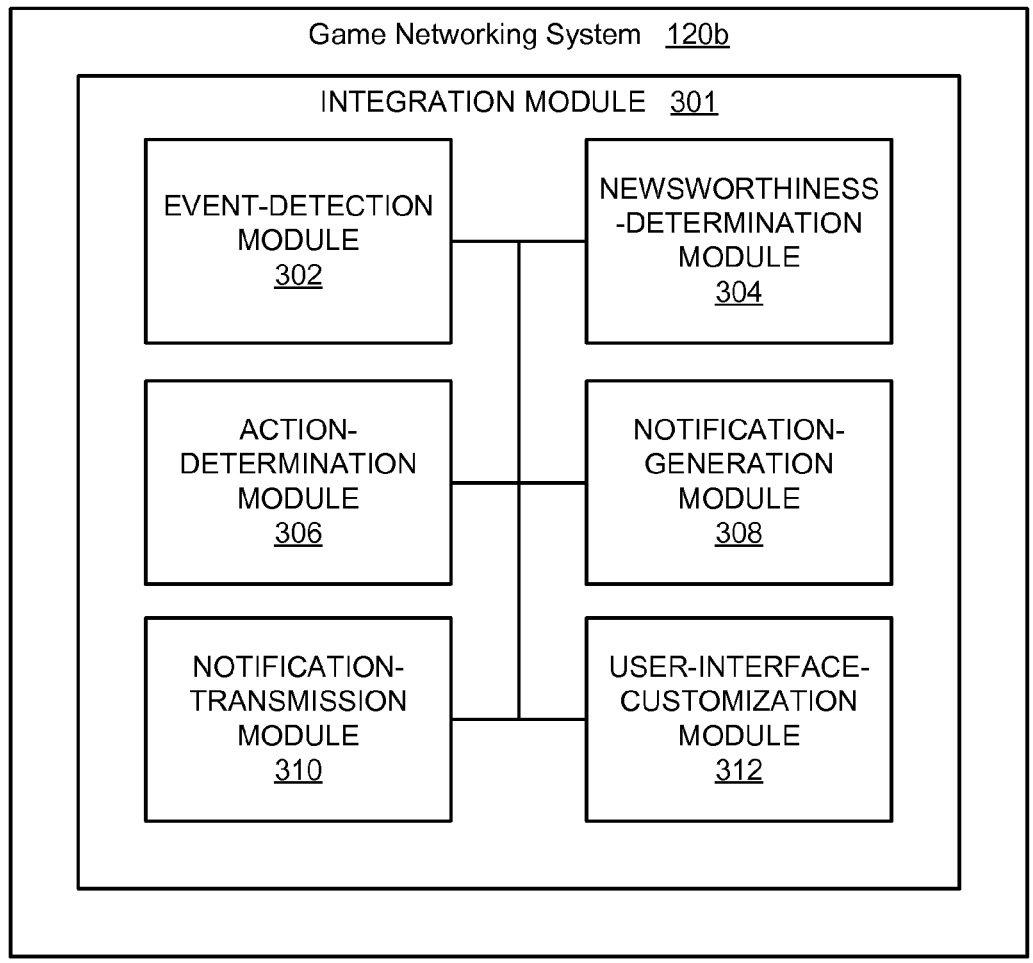
FIG. 3 is a block diagram illustrating example modules of the game networking system of FIG. 1.

FIG. 3 is a block diagram illustrating example modules of the game networking system 120b. The game networking system 120*b* includes an integration module 301 configured to integrate actionable social news and their corresponding notifications into the game networking system 120*b*. The integration module 301 may include an event-detection module 302 configured to detect events pertaining to the game networking system 120*b*. The integration module 301 may include a newsworthiness-determination module 304 configured to determine a newsworthiness to one or more users of the game networking system 120*b* of one or more actions detected by the detection module 302. The integration module 301 may include an action-determination module 306 configured to determine one or more actions that a user may be interested in performing on the game networking system 120*b* in response to receiving a notification. The integration module 301 may include a notification-generation module 308 configured to generate a notification that includes information that may be newsworthy to a user as well as a suggestion of one or more actions that the user may perform on the game networking system 120*b* in response to receiving the information. The integration module 301 may include a notification-transmission module 310 configured to send the notification to the user. For example, the notification-transmission module 310 may send the notification as a push message to a mobile device owned by the user. The integration module 301 may include a user-interface customization module 312 configured to customize a user interface of a game executed on the game networking system 120*b* in response to a determination that a user has accessed the game networking system 120*b* with an intent to perform a particular action.

Figure 4:
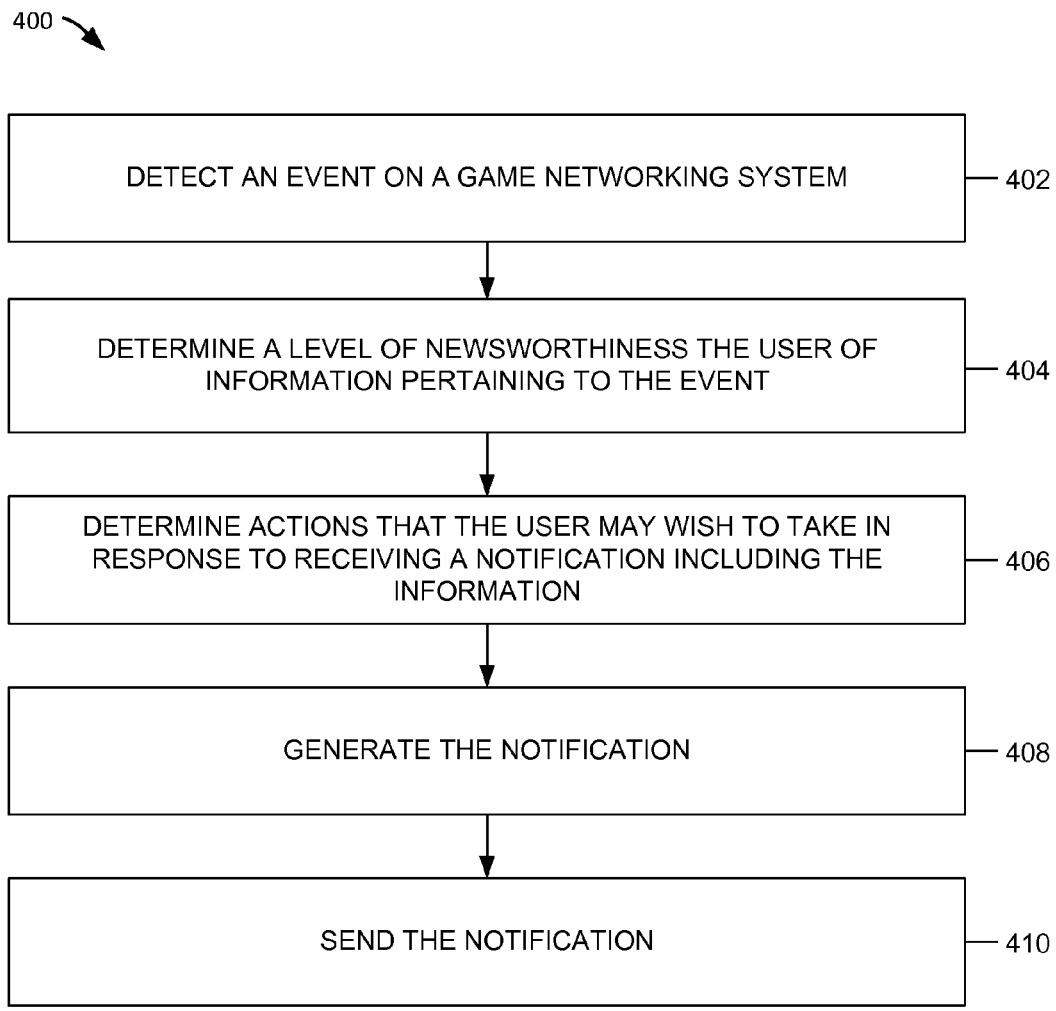
FIG. 4 is a flowchart illustrating an example method of sending a notification to a user of the game networking system of FIG. 1 to increase the likelihood that the user will be active with respect to the game networking system on a particular day.

FIG. 4 is a flowchart illustrating an example method 400 of sending a notification to a user of a game networking system 120*b* to increase the likelihood that the user will be active with respect to the game networking system 120*b* on a particular day. In various embodiments, the method 400 may be implemented by the integration module 301. At operation 402, the event-detection module 302, for example, may detect an event on the game networking system 120*b*. Events may be any change to the state of the game networking system 120*b*. Examples of events may include a change in a status of a player with respect to the game networking system 120*b*. For example, a formerly "lost" (e.g., inactive) player may become a "found" (e.g., active) player again with respect to the game networking system 120*b* (e.g., the player may start playing a game that he had previously quit playing), a player may be "discovered" (e.g., start playing a game that he has not played before), or player may become a lost player (e.g., quit playing a game for an amount of time that exceeds a threshold). Other examples of events may include a player achieving a goal within a game. For example, a player may place in a final round of a particular style of tournament, such as a shoot out, "sit and go," or Power Tourney in Zynga Poker, reach a new experience level (e.g., by earning enough experience points to transgress a threshold), win a hand of a card game with a particular combination of cards (e.g., a Royal Flush), win a pot greater than a certain amount or percentage of all pots, play at a table that requires a stake exceeding a particular stake size; win a tournament of a particular type (e.g., a weekly tournament). Other examples of events may pertain to competitive challenges in which multiple players are engaged. For example, a first player may pass a second player with respect to a certain scoring metric (e.g., chips won, tournaments won, and so on), or a first player may change position with respect to a second player on a leaderboard associated with a game of the game networking system 120*b*. Other examples of events may include actions taken by a player within a game. For example, a player may go all in for a number of chips in a poker game, wherein the number is relatively large (e.g., more than the player has ever wagered before). Other examples of events may include negative things that happen to a player within a game. For example, a player may lose a number of chips in a single hand of a card game, such as a relatively large number (e.g., more than the player has ever lost before in a single hand). Or the player may lose a number of chips over a period of time (e.g., a day or week), such as a large number (e.g., more than another player has ever lost over the time period). Other examples of events may include activities that friends of a player have each performed with respect to the game networking system 120*b*. For example, a particular number of friends of a player may have each played a particular game over a particular time (e.g., 10 friends of the player may have played poker in the last week) or a particular number of friends of a player may have played a game together at a particular time (e.g., four friends of the player may have played poker together on Friday night).

At operation 404, the newsworthiness-determination module 304, for example, determines a newsworthiness to a user of information pertaining to an event detected on the game networking system 120*b*. The newsworthiness-determination module 304 may determine the newsworthiness of the information to the user based on various factors, such as a relationship between the user and a player associated with the event (e.g., a social relatedness between the user and the player) or a relationship between the information pertaining to the event and information known about the user (e.g., a correspondence between the type of game to which the information pertains and the types of games that the user prefers to play). Thus, in various embodiments, the newsworthiness-determination module 304 may determine that a particular event involving a subject (e.g., a game) that is of particular interest to the user and featuring a friend having a distant social relationship to the user would likely to be more newsworthy to the user than an event involving an subject that is of less interest to the user but features a friend having a closer social relationship to the user. In other words, in various embodiments, the content of the information provided to the user in a notification may lead to increases in the user's social connectivity with other users, such as information that includes references to other users that are just outside the user's circle of friends.

At operation 406, the action-determination module 306 determines one or more actions that a user may wish to make in response to receiving the information pertaining to the event. For example, the action-determination module 306 may determine that the user is likely to want to send a message (e.g., kudos) to a friend of the user in response to receiving good news about the friend with respect to the game networking system 120*b* (e.g., that the friend has won a tournament of a particular type, reached a new experience level, won a big hand in a card game, won a hand of a card game with a certain combination of cards, or won a large pot). Or the action-determination module 306 may determine that the user is likely to want to play a game in response to receiving news of activities that a friend of the user has performed with respect to the game networking system 120*b* (e.g., that the friend has passed the user with respect to a gaming metric, such as chip count, experience points, position on a leaderboard, and so on; that the friend of the user has played or is playing a game with other friends of the user; that the friend of the user and other friends of the user have played a game within a time period, such as a day, week, or month; and so on). Or the action-determination module 306 may determine that the user is likely to want to send a gift to a friend in response to receiving news that the friend has had a negative experience with respect to the game networking system 120*b*. For example, the action-determination module 306 may determine that the player is likely to want to send chips, virtual currency, or other virtual items to a friend in response to news that the friend lost a big percentage of his chips in a single hand of a card game, that the friend has lost a particular number of chips within a time frame (e.g., a week or day), that the friend has been inactive with respect to a game for a particular time period, that the friend has just started playing a game for the first time, that the friend has just started playing a game again after having been inactive for a particular amount of time, and so on. The action-determination module 306 may determine which actions the user is likely to want to perform in response to receiving information pertaining to an event based on various factors, such as actions that the user or other users have performed in response to receiving similar information; preferences of the user, such as actions that the user typically likes to perform with respect to the game networking system 120*b*, and so on.

At operation 408, the notification-generation module 308, for example, generates a notification that includes the information pertaining to the event. The notification may include information about one or more actions that the user is likely to want to make in response to receiving the information. The notification may include an embedded link that, for example, enables the user to perform the one or more actions by simply clicking on the link when the notification is presented to the user in a user interface, such as a web page. The notification may include information pertaining to a incentive that is to be provided to the user based on the user performing an action on the game networking system 120*b* (e.g., within a certain time period, such as a day) in response to receiving the notification. The notification-generation module 308 may determine whether to include an incentive and, if so, the size of the incentive, based on, for example, an analysis of the effectiveness of past incentives at encouraging the user or other users to be more active with respect to the game networking system 120*b*.

At operation 410, the notification-transmission module 310, for example, sends the notification to the user. The notification-transmission module 310 may send the notification to the user based on certain rules or conditions being satisfied (e.g., to reduce the chances that the user will treat the notification as spam), as described in more detail below.

Figure 5:
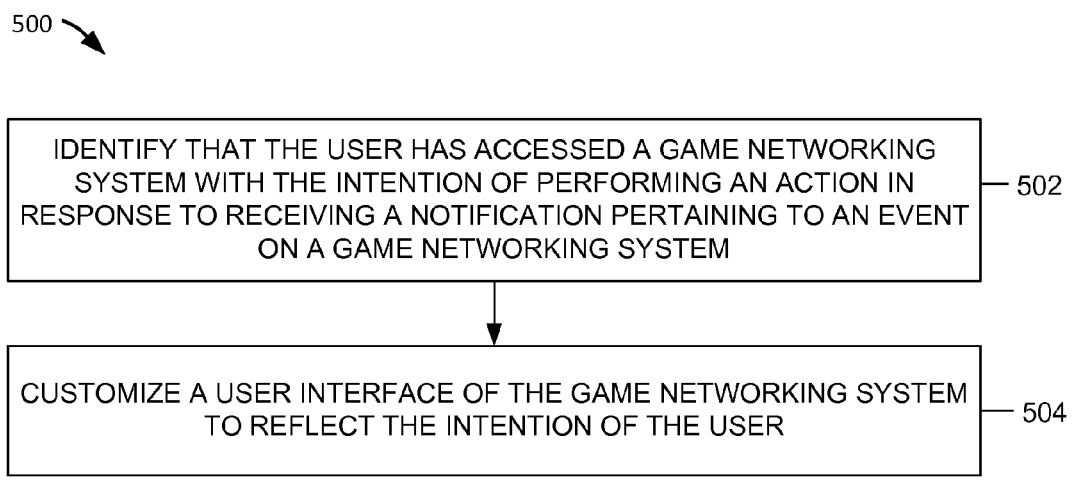
FIG. 5 is a flowchart illustrating an example method of controlling a flow of notifications sent to a user (e.g., to reduce the chances that the user will treat the notifications as spam)

FIG. 5 is a flowchart illustrating an example method 500 of controlling a flow of notifications sent to a user (e.g., to reduce the chances that the user will treat the notifications as spam). In various embodiments, the method 500 may be implemented by the integration module 301. At operation 502, the event-detection module 302, for example, determines that a user of a game networking system has accessed a game networking system with an intention to perform an action in response to receiving a notification pertaining to an event on a game networking system 120*b*. For example, the event-detection module 302 may determine that the user was directed to the game networking system 120*b* based on a clicking of a link presented to the user in a user interface. For example, metadata contained in a Uniform Resource Locator (URL) by which the user attempts to access the game networking system 120*b* may include information about a particular notification the user is responding to or a particular action that the user wishes to perform on the game networking system 120*b* in response to having received the notification.

At operation 504, the user-interface-customization module 312, for example, customizes a user interface of the game networking system 120*b* to reflect the user's intention to perform an action in response to receiving a notification. For example, if the user has received a notification that a friend of his has passed his score on a leaderboard in a particular game, the user may indicate an intention to play the game in response to receiving the notification. In this case, the user-interface-customization module 312 may immediately place the user in the appropriate game, bypassing navigation screens that would normally be presented. Or, if the user has received an indication that a friend has lost chips in a card game, the user may indicate an intention to send the player a gift of chips in response to receiving the notification. In this case, the user-interface-customization module 312 may immediately present a user interface to the user that enables the user to provide the gift to his friend (and, in various embodiments, other friends as well). By navigating to a particular user interface within the game networking system 120*b* that is particularly adapted to the action that the user has expressed an intention of performing in response to receiving a notification, or by otherwise adapting content (e.g., text or graphics displayed to the user in a user interface) in a manner that is contextually-appropriate for an action that the user intends to perform, the game networking system 120*b* may make it more likely that the user will actually perform the action, thus increasing the user's activity level with respect to the game networking system 120*b*. In other words, based on a detection that the user is accessing the game networking system 120*b* to perform a particular action in response to receiving a notification, the game networking system 120*b* may provide a user interface that is particularly adapted to enable the user to perform the action more quickly than if the user had accessed the game networking system in a different context (e.g., by navigating directly to a main lobby of the game networking system instead of clicking on a link to respond to the notification).

Figure 6:
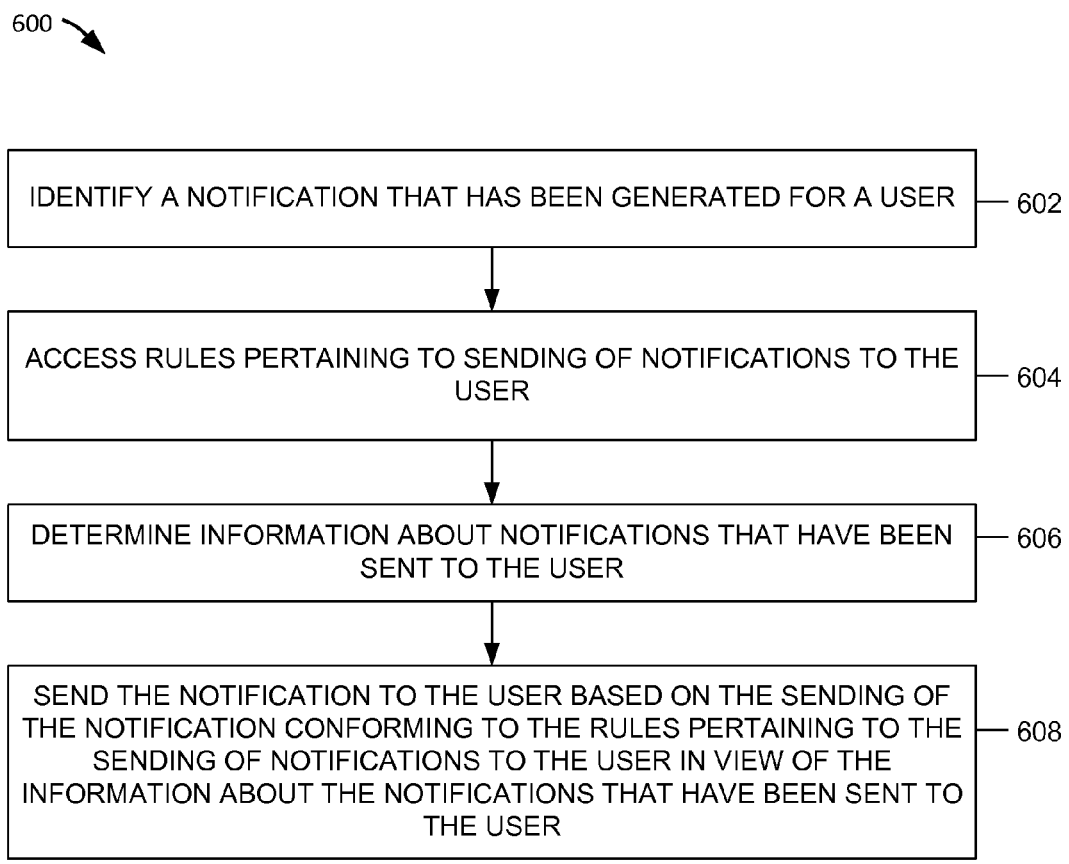
FIG. 6 is a flowchart illustrating an example method of controlling a flow of notifications sent to a user (e.g., to reduce the chances that the user will treat the notifications as spam)

FIG. 6 is a flowchart illustrating an example method 600 of controlling a flow of notifications sent to a user (e.g., to reduce the chances that the user will treat the notifications as spam). In various embodiments, the method 600 may be implemented by the integration module 301. At operation 602, the notification-transmission module 310, for example, may identify that a notification has been generated for a user. At operation 604, the notification-transmission module 310 may access rules pertaining to the sending of notifications to the user. Such rules may specify user preferences with regard to the receiving of such notifications, such as how many notifications or a user wishes to receive such notifications over a time period (e.g., no more than 5 notifications per day or one notification per hour) or sub-time periods in which the user wishes to receive notifications over the time period (e.g., from 5-10 pm on a particular day), the types of messages that the user wishes to receive (e.g., bad news about friends, good news about friends, updates on the results of the friends of the user with respect to competitive or cooperative challenges in which the user is engaged, types of actions that friends have performed, and so on). In other words, the notification-transmission module 310 may enable the user to control the flow of notifications he receives. The rules may specify conditions determined by the game networking system 120*b* under which the notifications may be sent in order to balance a risk of alienating the user (e.g., having the user treat the notifications as spam) and the reward of increasing a level of participation of the user with respect to the game networking system 120*b*. Such conditions may be determined based on an analysis of a conversion rate of the user or other users with respect to past notifications, including the conditions under which the user responded to notifications in the past, or an analysis of the conversion rates of other users, including the conditions under which other users responded to notifications in the past. The conditions may include the frequency at which notifications were sent, the time of day at which notifications were sent, the types of the notifications that were sent, a correspondence between the preferences of the user and the content of the notifications, and other factors, such as one or more of the factors discussed above with respect to FIG. 4.

At operation 606, the notification-transmission module 310 may determine information about notifications that have been sent to the user (e.g., within a particular time period). For example, the notification-transmission module 310 may determine the subject matter of the notifications that have been sent, the types of the notifications that have been sent, the actions recommended in the notifications that have been sent, and so on. In other words, the notification-transmission module 310 may determine one or more attributes of notifications that have been sent to the user that are relevant to the rules accessed at operation 604.

At operation 608, the notification-transmission module 310 may send a notification to the user based on the rules pertaining to the sending of the notifications and the information about notifications that have been sent to the user (e.g., over a time period, such as over the last day). In other words, the notification-transmission module 310 may send a notification to the user based on the sending of the notification not violating any of the rules accessed in operation 604 in view of the information determined about notifications that have been sent to the user at operation 606. In this way, by analyzing data relevant to the conversion rates of users (e.g., the likelihood of turning an inactive user into an active user on a particular day), the game networking system 120b may send a notification to the user based on a determination that an optimum balance will continue to be maintained between the risk and reward associated with sending multiple notifications to the user over a period of time.

Figure 7:
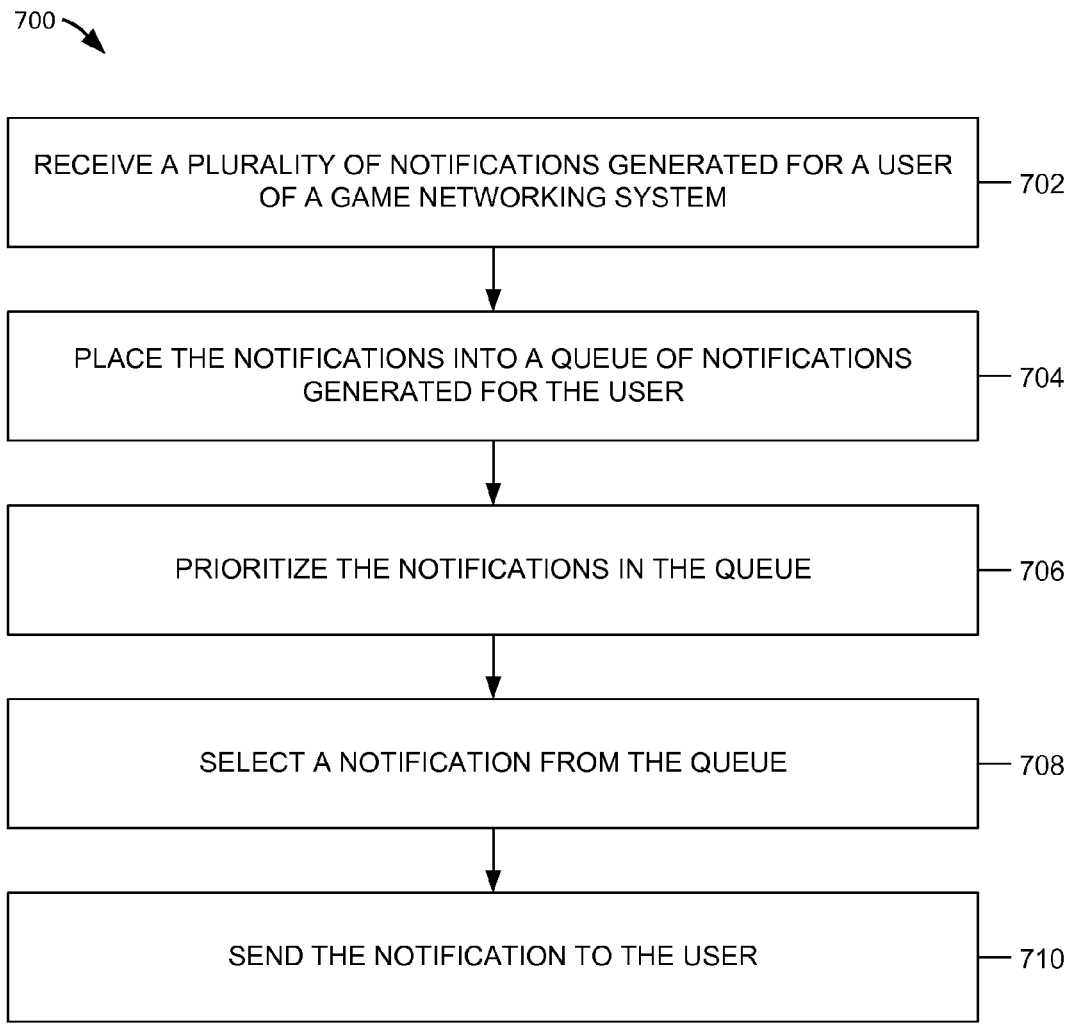
FIG. 7 is a flowchart illustrating an example method of managing notifications that are generated for a user.

FIG. 7 is a flowchart illustrating an example method 700 of managing notifications that are generated for a user. In various embodiments, the method 700 may be implemented by the integration module 301. At operation 702, the notification-transmission module 310, for example, receives a plurality of notifications that have been generated for a user of the game networking system 120b. At operation 704, the notification-transmission module 310 places the notifications into a queue of notifications that is specific to the user. At operation 706, the notification-transmission module 310 prioritizes the notifications in the queue (e.g., based on an analysis of which messages are most likely to convert the user from an inactive user to an active user of the game networking system 120b on a particular day). At operation 708, the notification-transmission module 310 selects a notification from the queue. For example, the notification-transmission module 310 selects a notification from the queue based on the notification having the highest priority. Additionally, the notification-transmission module 310 may select the notification based on other factors, such as whether similar notifications have been sent to the user recently (e.g., within the last hour or day), a recency of an event to which the notification pertains, a newsworthiness of the notification to the user, or any of the factors discussed above with respect to FIG. 3-5. In various embodiments, the notification-transmission module 310 may not consecutively select two notifications having the same type (e.g., including information about the same type of event, a same type of recommended action for the user to perform, a same subject, and so on) that was just sent; therefore, as discussed above, the selection of the notification may be based on information about previous notifications that were sent. In various embodiments, the notification-transmission module 310 may not send a notification pertaining to an event that occurred more than a certain time in the past (e.g., more than 24 hours in the past, one week in the past, and so on). In fact, the notification-transmission module 310 may remove such notifications from the queue. In various embodiments, the notification-transmission module 310 may dynamically reprioritize the queue as the game networking system 120b receives information concerning the effectiveness of notifications (e.g., based on conversion rates of other users receiving similar notifications). The prioritizing may be based on accessing of rules pertaining to the sending of messages, as described above. In various embodiments, the notification transmission module 310 may skip operation 708 based on a determination that the most recently-generated message has a higher priority than at least one if not all of the notifications in the queue.

At operation 710, the notification-transmission module 310 may send the notification to the user. The sending of the notification may be based on the accessing of rules governing the sending of notifications to the user, as described above. For example, based on an analysis of various rules, the notification-transmission module 310 may determine to send the highest priority message in the queue to the user every four hours. In this way, the notifications that the user receives may be only the notifications that the user would find to be the most interesting or newsworthy or that are otherwise most likely to convince the user to become active with respect to the game networking system 120b on a particular day without causing the user to classify the notifications as spam.

Game Interfaces

In various embodiments, a player 101 of a client system (e.g., client system 2930 of FIG. 9, described below) can use a browser client (e.g., Firefox, Chrome, Internet Explorer, etc.) to access the online game over the Internet (or other suitable network). For example, a game interface may be automatically generated and presented to the user in response to the user visiting or accessing the game operator's website or a third-party's website from client system 130 with a browser client. Game networking system 120b can transmit data to client system 130, thereby allowing it to display the game interface, which is typically some type of graphic user interface. For example, the webpage downloaded to client system 130 may include an embedded call that causes client system 130 to download an executable object, such as a Flash.SWF object, which executes on client system 130 and renders the game within the context of the webpage. Other interface types are possible, such as server-side rendering and the like. The game interface is configured to receive signals from the player 101 via client system 130. For example, the player 101 can click on the game interface or enter commands from a keyboard or other suitable input device. The game engine can respond to these signals to allow game play. The display of the game interface can change based on the output of the game engine, the input of the player, and other signals from game networking system 120b and client system 130.

The game interface can display various game components, such as the game environment, options available to the player (e.g., in-game actions, preferences, settings, etc.), game results, and so forth. Some components of the game interface may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to game interface. The user can also click on various user interface elements in game interface to activate various game options.

One skilled in the art would appreciate that the present disclosure is intended to encompass a variety of game types, including gambling games, role-playing games, puzzle games, and the like.

Data Flow

Figure 8:
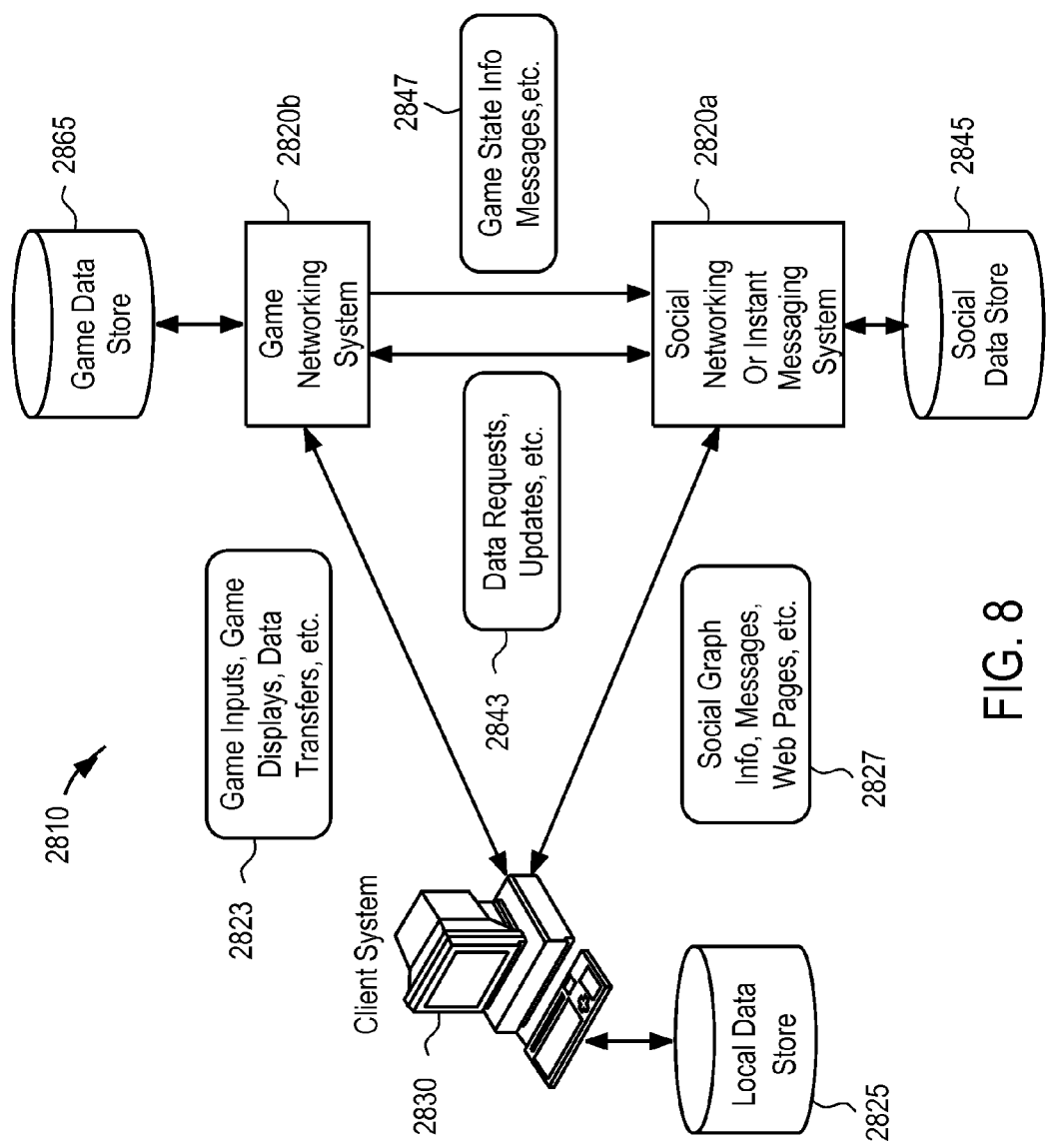
FIG. 8 is a block diagram illustrating an example data flow between the components of an example system.

FIG. 8 is a block diagram illustrating an example data flow between the components of system 2810. In particular embodiments, system 2810 can include client system 2830, social networking system 2820a, and game networking system 2820b. The components of system 2810 can be connected to each other in any suitable configuration and use any suitable type of connection. The components may be connected directly or over any suitable network. Client system 2830, social networking system 2820a, and game networking system 2820b can each have one or more corresponding data stores such as local data store 2825, social data store 2845, and game data store 2865, respectively. Social networking system 2820a and game networking system 2820b can also have one or more servers that can communicate with client system 2830 over an appropriate network. Social networking system 2820a and game networking system 2820b can have, for example, one or more internet servers for communicating with client system 2830 via the Internet. Similarly, social networking system 2820a and game networking system 2820b can have one or more mobile servers for communicating with client system 2830 via a mobile network (e.g., GSM, PCS, Wi-Fi, WPAN, etc.). In some embodiments, one server may be able to communicate with client system 2830 over both the Internet and a mobile network. In other embodiments, separate servers can be used.

Client system 2830 can receive and transmit data 2823 to and from game networking system 2820b. This data can include, for example, webpages, messages, game inputs, game displays, HTTP packets, data requests, transaction information, updates, and other suitable data. At some other time, or at the same time, game networking system 2820b can communicate data 2843, 2847 (e.g., game state information, game system account information, page info, messages, data requests, updates, etc.) with other networking systems, such as social networking system 2820a (e.g., Facebook, Myspace, etc.). Client system 2830 can also receive and transmit data 2827 to and from social networking system 2820a. This data can include, for example, webpages, messages, social graph information, social network displays, HTTP packets, data requests, transaction information, updates, and other suitable data.

Communication between client system 2830, social networking system 2820a, and game networking system 2820b can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as HTTP, and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HTML documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820b, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820b. Game networking system 2820b may itself operate by retrieving a copy of the BLOB from a database or an intermediate memory cache (memcache) layer. Game networking system 2820b can also de-serialize the BLOB to resolve the game state parameters and execute its own game logic based on the events in the batch file of events transmitted by the client to synchronize the game state on the server side. Game networking system 2820b may then re-serialize the game state, now modified, into a BLOB and pass this to a memory cache layer for lazy updates to a persistent database.

With a client-server environment in which the online games may run, one server system, such as game networking system 2820b, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820b for further processing. In addition, multiple client systems 2830 may transmit other types of application data to game networking system 2820b.

In particular embodiments, a computed-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 2830, either caused by an action of a game player or by the game logic itself, client system 2830 may need to inform game networking system 2820b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multi-player online game hosted on a network-addressable system (such as, for example, social networking system 2820a or game networking system 2820b), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics and support bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 120a or game networking system 2820b). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 2830, the Flash client may send the events that caused the game state changes to the in-game object to game networking system 2820b. However, to expedite the processing and hence the speed of the overall gaming experience, the Flash client may collect a batch of some number of events or updates into a batch file. The number of events or updates may be determined by the Flash client dynamically or determined by game networking system 2820b based on server loads or other factors. For example, client system 2830 may send a batch file to game networking system 2820b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820b may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 2820b may retrieve the corresponding BLOB from the database to determine the most-recent values of the game-related data. In particular embodiments, while a player is playing the online game, game networking system 2820b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 9:
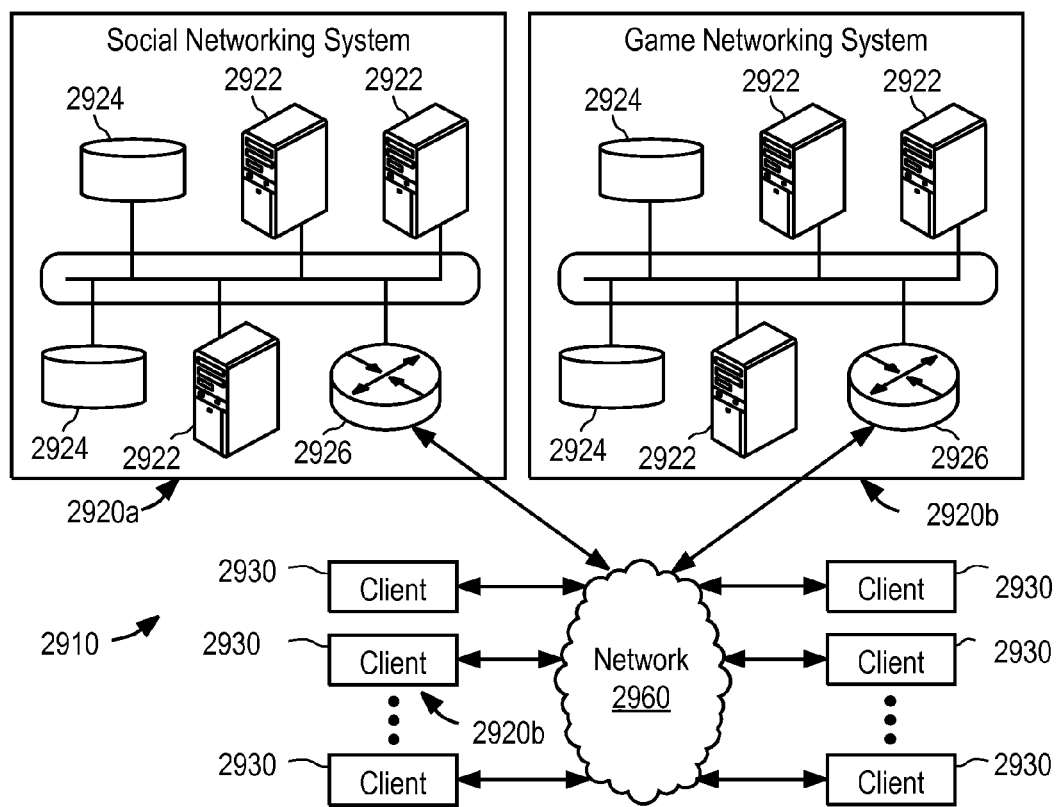
FIG. 9 is a block diagram illustrating an example network environment in which various example embodiments may operate.

Particular embodiments may operate in a WAN environment, such as the Internet, including multiple network addressable systems. FIG. 9 is a block diagram illustrating an example network environment 2910, in which various example embodiments may operate. Network cloud 2960 generally represents one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 9 illustrates, particular embodiments may operate in a network environment comprising one or more networking systems, such as social networking system 2920a, game networking system 2920b, and one or more client systems 2930. The components of social networking system 2920a and game networking system 2920b operate analogously; as such, hereinafter they may be referred to simply as networking system 2920. Client systems 2930 are operably connected to the network environment via a network service provider, a wireless carrier, or any other suitable means.

Networking system 2920 is a network addressable system that, in various example embodiments, comprises one or more physical servers 2922 and data stores 2924. The one or more physical servers 2922 are operably connected to computer network 2960 via, by way of example, a set of routers and/or networking switches 2926. In an example embodiment, the functionality hosted by the one or more physical servers 2922 may include web or HTTP servers, FTP servers, and application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 2924 corresponds to one or more of a variety of separate and integrated databases, such as relational databases and object-oriented databases, that maintain information as an integrated collection of logically related records or files stored on one or more physical systems. Structurally, data store 2924 may generally include one or more of a large class of data storage and management systems. In particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is generally a computer or computing device including functionality for communicating (e.g., remotely) over a computer network. Client system 2930 may be a desktop computer, laptop computer, personal digital assistant (PDA), in- or out-of-car navigation system, smart phone or other cellular or mobile phone, or mobile gaming device, among other suitable computing devices. Client system 2930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be URLs and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier (ID), as well as information identifying or characterizing the web browser or operating system running on the user's client computing device 2930. The request may also include location information identifying a geographic location of the user's client system or a logical network location of the user's client system. The request may also include a timestamp identifying when the request was transmitted.

Although the example network environment 2910 described above and illustrated in FIG. 9 is described with respect to social networking system 2920a and game networking system 2920b, this disclosure encompasses any suitable network environment using any suitable systems. As an example and not by way of limitation, the network environment may include online media systems, online reviewing systems, online search engines, online advertising systems, or any combination of two or more such systems.

Figure 10:
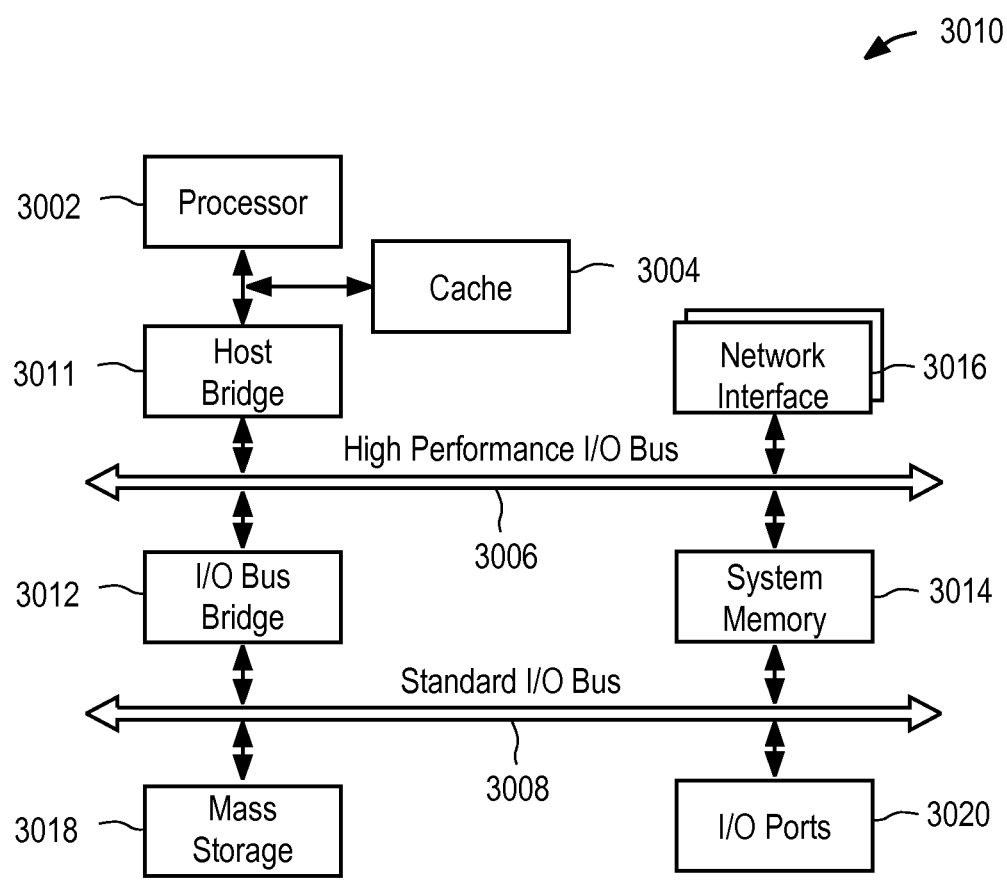
FIG. 10 is a block diagram illustrating an example computing system architecture that may be used to implement a server or a client system.

FIG. 10 is a block diagram illustrating an example computing system architecture, which may be used to implement a server 2922 or a client system 2930. In one embodiment, hardware system 3010 comprises a processor 3002, a cache memory 3004, and one or more executable modules and drivers, stored on a tangible computer readable medium, directed to the functions described herein. Additionally, hardware system 3010 may include a high performance input/output (I/O) bus 3006 and a standard I/O bus 3008. A host bridge 3011 may couple processor 3002 to high performance I/O bus 3006, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 (e.g., DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures, and various components of hardware system 3010 may be rearranged. For example, cache 3004 may be on-chip with processor 3002. Alternatively, cache 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The invention claimed is:

1. A method of reducing a probability that a notification that includes information pertaining to an event on a game networking system and that pertains to a player of a game executing on the game networking system is treated as spam by an additional player of the game, the method comprising:
   detecting the event on the game networking system, the event relating to an outcome of an action that the player performed with respect to the game;
   determining a newsworthiness to the additional player of the information pertaining to the event, the determining of the newsworthiness based at least in part on a preference of the additional player with respect to a type of the game and a parameter of a relationship between the player and the additional player, the determining of the newsworthiness performed by a computer processor configured to implement a newsworthiness module; and
   based on the newsworthiness, determining an action to recommend that the additional player perform in response to receiving the information pertaining to the event, generating a notification that includes the information pertaining to the event and information pertaining to the action, and sending the notification to the additional player, wherein the sending of the notification is based on a rule generated to balance a probability of alienating the additional player with a probability of increasing a level of participation of the additional player with respect to the game networking system.

2. The method of claim 1, wherein a friend of the additional player is a subject of the information pertaining to the event and the determining of the newsworthiness is based on a strength of a relationship between the additional player and the friend of the additional player.

3. The method of claim 1, further comprising determining the action based on actions that other players of the game performed in response to receiving similar information.

4. The method of claim 1, further comprising determining the action based on actions that the additional player has performed in response to receiving similar information.

5. The method of claim 1, wherein the information pertaining to the action includes a link that enables the additional player to perform the action on the game networking system by clicking on the link in a user interface.

6. The method of claim 1, wherein the parameter is a closeness of a relationship and the determining of the newsworthiness is further based on a determination that the closeness of the relationship is within a closeness threshold.

7. The method of claim 1, wherein the preference of the additional player with respect to the type of the game is determined based on a monitoring of types of games that the additional player prefers to play on the game networking system.

8. The method of claim 1, further comprising selecting the recommendation based on previously sent notifications, including at least one of a type of event included in a previously sent notification and a subject of information pertaining to the event included in the previously sent notification.

9. The method of claim 1, further basing the determining of the action to recommend, the generating of the notification, and the sending of the notification on based on a prioritizing of the notification in a queue of notifications, the prioritizing based on a probability that the additional user will accept the recommendation.

10. A system comprising:
   a processor-implemented integration module configured to:
   detect an event on a game networking system, the event relating to an outcome of an action that a player of a game executing on a game networking system performed with respect to the game;
   determine a newsworthiness to an additional player of the game of information pertaining to the event, the determining of the newsworthiness based at least in part on a preference of the user with respect to a type of the game and a parameter of a relationship between the player and the additional player being; and
   based on the newsworthiness, determine an action that the additional player is recommended to perform in response to receiving the information, generate a notification that includes the information pertaining to the event and information pertaining to the action, and send the notification to the additional player, wherein the sending of the notification is based on a rule generated to balance a probability of alienating the additional player with a probability of increasing a level of participation of the additional player with respect to the game networking system.

11. The system of claim 10, wherein the integration module is further configured to determine the action based on actions that other players of the game performed in response to receiving similar information.

12. The system of claim 10, wherein the integration module is further configured to determine the action based on actions that the additional player has performed in response to receiving similar information.

13. The system of claim 10, wherein the information pertaining to the action includes a link that enables the additional player to perform the action on the game networking system by clicking on the link in a user interface.

14. A non-transitory machine-readable storage medium embodying a set of instructions that, when executed by at least one processor, causes the processor to perform operations, the operations comprising:
   detecting an event on a game networking system, the event including an outcome of an action that a player of a game executing on the game networking system performed with respect to the game;
   determining a newsworthiness to an additional player of the game of information pertaining to the event, the determining of the newsworthiness based at least in part on a preference of the additional player with respect to a type of the game and a parameter of a relationship between the player and the additional player; and
   based on the newsworthiness, determining an action to recommend that the additional player perform in response to receiving the information, generating a notification that includes the information pertaining to the event and information pertaining to the action, and sending the notification to the additional player, wherein the sending of the notification is based on a rule generated to balance a probability of alienating the additional player with a probability of increasing a level of participation of the additional player with respect to the game networking system.

15. The non-transitory machine-readable medium of claim 14, wherein a friend of the additional player is a subject of the information pertaining to the event and the determining of the newsworthiness is based on a strength of a relationship between the additional player and the friend of the additional player.

16. The non-transitory machine-readable medium of claim 14, the operations further comprising determining the action based on actions that other players of the game performed in response to receiving similar information.

17. The non-transitory machine-readable medium of claim 14, the operations further comprising determining the action based on actions that the additional player has performed in response to receiving similar information.

* * * * *

UNITED STATES PATENT AND TRADEMARK OFFICE
CERTIFICATE OF CORRECTION

PATENT NO. : 9,842,169 B1
APPLICATION NO. : 13/566602
DATED : December 12, 2017
INVENTOR(S) : Shim et al.

Page 1 of 1

It is certified that error appears in the above-identified patent and that said Letters Patent is hereby corrected as shown below:

In the Claims

In Column 25, Line 66, in Claim 9, after "notification", delete "on"

Signed and Sealed this
Twenty-first Day of April, 2020

Andrei Iancu
*Director of the United States Patent and Trademark Office*